(12) United States Patent
Dahlman

(10) Patent No.: US 7,049,710 B2
(45) Date of Patent: May 23, 2006

(54) POWER BUS FOR DISTRIBUTED RIDE THROUGH CAPABILITY

(75) Inventor: Mark C. Dahlman, Antioch, TN (US)

(73) Assignee: Square D Company, Palatine, IL (US)

( * ) Notice: Subject to any disclaimer, the term of this patent is extended or adjusted under 35 U.S.C. 154(b) by 518 days.

(21) Appl. No.: 10/288,856

(22) Filed: Nov. 5, 2002

(65) Prior Publication Data

US 2004/0085693 A1 May 6, 2004

(51) Int. Cl.
H02J 7/34 (2006.01)
H02M 3/06 (2006.01)

(52) U.S. Cl. ............................ 307/48; 307/20; 307/109
(58) Field of Classification Search .................. 307/20, 307/48, 109
See application file for complete search history.

(56) References Cited

U.S. PATENT DOCUMENTS

| 3,596,165 A | * | 7/1971 | Andrews ...................... 363/19 |
| 5,434,770 A | * | 7/1995 | Dreifuerst et al. ............. 363/65 |
| 5,500,791 A | * | 3/1996 | Kheraluwala et al. ......... 363/17 |
| 5,593,430 A | * | 1/1997 | Renger .......................... 607/18 |
| 5,735,887 A | * | 4/1998 | Barreras et al. ............... 607/60 |
| 6,101,608 A | * | 8/2000 | Schmidt et al. ................. 726/2 |
| 6,330,169 B1 | * | 12/2001 | Mullett et al. ................. 363/16 |
| 6,476,729 B1 | * | 11/2002 | Liu ......................... 340/870.11 |
| 6,856,283 B1 | * | 2/2005 | Jacobson et al. ............ 342/368 |
| 6,921,987 B1 | * | 7/2005 | Marin-Martinod ........... 307/32 |
| 6,930,893 B1 | * | 8/2005 | Vinciarelli .................... 363/17 |
| 2004/0186929 A1 | * | 9/2004 | Salerno ........................ 710/16 |

OTHER PUBLICATIONS

The Electrical Engineering Handbook, Edited by Richard C. Dorf, CRC Press LLC, 2000, Chapter 1.2—Capacitors and Inductors—written by Glen Ballou, p. 3.*

* cited by examiner

Primary Examiner—Brian Sircus
Assistant Examiner—Hai I. Kaplan

(57) ABSTRACT

A monitoring system includes a power source, a power bus coupled to said power source, a plurality of power taps coupled to said power bus, each of said power taps having a ride-through capacitor operatively coupled thereto to provide power during brief interruptions in the power supply to said power bus by said power source.

23 Claims, 1 Drawing Sheet

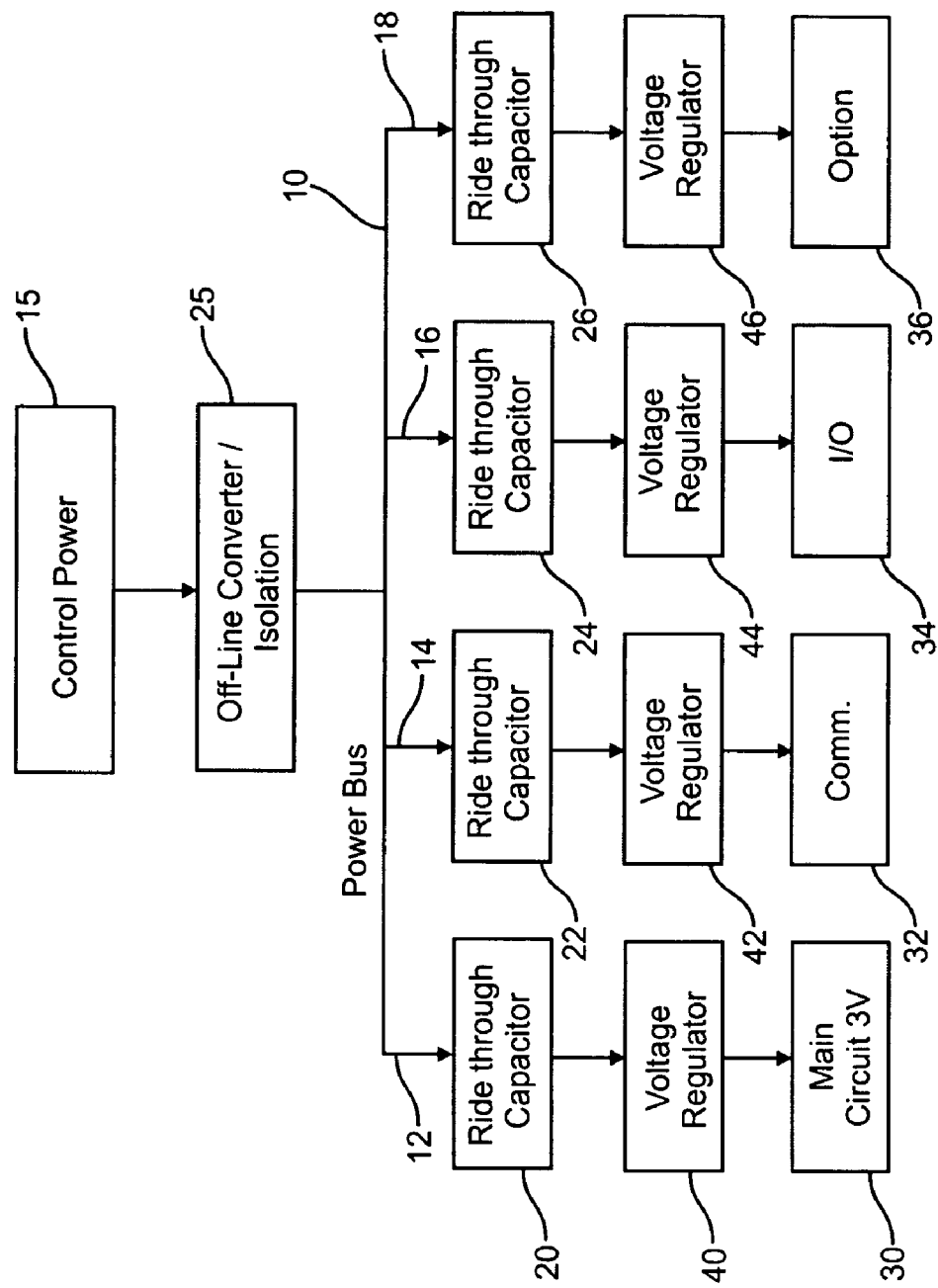

POWER BUS FOR DISTRIBUTED RIDE THROUGH CAPABILITY

BACKGROUND OF THE INVENTION

This invention is directed generally to monitoring/metering and more particularly to compensating for brief interruptions in the supply power for a power monitoring unit.

The art of power circuit monitoring continues to develop. Long standing monitoring systems, for example for residential use, have in the past consisted of nothing more sophisticated than fuses, and more commonly, circuit breakers which have a given power/time characteristic so that the circuit is broken or switched to an open circuit condition, usually at a power distribution center or breaker box, when the current through the protected line exceeds the power/time characteristic of the circuit breaker or fuse component or the like.

Power monitoring systems monitor the flow of electrical power in circuits through a plant or other facility. In the POWERLOGIC system manufactured by the instant assignee, circuit monitors and power meters are dedicated to power monitoring, while other compatible devices collect additional equipment information from protective relays, circuit breakers, transformers, temperature controllers, and panelboards. Electrical data, such as current, power, energy waveforms, and equipment status, is passed over a data network to one or more computers. The computers run power monitoring application software that retrieves, stores, organizes, and displays real-time circuit information in simple, usable formats. The information collected and stored in a power monitoring system helps operate a facility more efficiently. The quality of the data depends upon the accuracy of the instrumentation and the usability of the display formats.

The power meter can replace conventional metering devices such as ammeters, voltmeters, and watt-hour meters while providing other capabilities not offered by analog metering. The power meter's true root mean square (rms) readings reflect non-linear circuit loading more than conventional analog metering devices. The power meter calculates the neutral current, which can assist in identifying overloaded neutrals due to either unbalanced single phase loads or triple harmonics. Circuits can be closely monitored for available capacity by keeping track of the peak average demand current.

The power meter can provide a full complement of rms metering values to a metering display and/or via a standard communication port to a power monitoring and control system. The display is connected to the power meter with a communications cable and allows the user to view metering data and access meter setup and reset menus. The display can be mounted at a remote location relative to the power meter itself.

In power metering systems made by the Square D Company, the assignee of this application, a modular or building block system is used. This system incorporates a base unit with one or more additional units, such as a main metering circuit, a communications unit and an input/output unit or module, each of which may require a particular DC operating voltage. These operating voltages have generally been supplied through an off-line voltage regulator/converter in the base unit which supplies required DC voltages which may be tapped into for the various other modules. In order to maintain power to the various modules during relatively brief power outages, a single ride-through capacitance has been provided in the base unit.

Since this ride-through capacitance is required to provide operating power for the power metering system, a large, heavy ride-through capacitor bank is generally required. This is done to accommodate the maximum power load which may be required for a system having a maximum number of modules with the maximum power requirement. However, providing such a large capacitor bank with the base unit is relatively expensive and also adds to the required size of the base unit. Examples of such systems manufactured by the Square D Company include POWERMETER® 600 series and CM 3000™ and CM 4000™ series metering systems. In these systems, a relatively large base unit is provided having extra internal ports available for plugging in options modules which are mounted on cards. The present invention, while useful in such systems, was designed for a power meter requiring a relatively small base unit, wherein the options can be added as separate modules mounted externally to the base unit.

OBJECTS OF THE INVENTION

Accordingly, it is a general object of the invention to provide a method and system for compensating for brief interruptions in the supply power for a power monitoring unit.

SUMMARY OF THE INVENTION

Briefly, in accordance with the foregoing, a monitoring system generally includes a power source, a power bus coupled to said power source, a plurality of power taps coupled to said power bus, each of said power taps having a ride-through capacitor operatively coupled thereto to provide power during brief interruptions in the power supply to said power bus by said power source.

The present invention also provides for a method of providing power to a monitoring system. The method includes coupling a power bus to a power source, providing a plurality of power taps on the power bus, and operatively coupling a ride-through capacitor to each of the power taps to provide power through the power tap during brief interruptions in the power supply to the power bus from the power source.

The above summary of the present invention is not intended to represent each embodiment, or every aspect, of the present invention. This is the purpose of the FIGURE and the detailed description which follow.

BRIEF DESCRIPTION OF THE DRAWINGS

The foregoing and other advantages of the invention will become apparent upon reading the following detailed description and upon reference to the drawings.

The FIGURE is a functional block diagram of a power metering system with a distributed ride-through capacitance in accordance with the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

This invention solves the cost and size problems associated with supplying a large capacitor bank with the base unit of an expandable power metering system. Such a system is typically required to continue to operate when there are brief interruptions in the supply power. The invention allows for each module of the expandable system to provide its own power during interruptions in the supply power. This will reduce the cost and size of the base unit.

Referring to FIG. 1, a power metering system includes a main power bus 10 with a plurality of power taps 12, 14, 16, 18. Control power 15 maybe supplied to the bus 10 via an off-line converter with isolation 25. Each tap will have the associated "ride through" capacitance 20, 22, 24, 26 needed for its load to "ride through" a power interruption. Taps on the distributed power bus could include but are not limited to a main metering circuitry 30, an optional communications module 32, and an optional I/O module 34, and other optional option modules 36.

The main power bus 10 has a nominal power bus voltage which is at a higher voltage than the voltage of each circuits it is supplying. The bus voltage of the power bus 10 is dropped to the voltage required for each circuit via linear or switching voltage regulators 40, 42, 44, 46, one for each circuit. In a specific embodiment, the bus voltage is 13V, however the present invention is not limited to a specific bus voltage. The voltage regulators 40, 42, 44, 46 may provide electrical isolation from the main power bus 10 to prevent hazardous voltage from being introduced to the bus.

The energy difference between the nominal power bus voltage and the circuit voltage in the ride-through capacitor associated with the tap is equal to the energy for that tap to stay powered during supply power interruption. This energy difference is given by the following equation:

$$\frac{P_1 \cdot t}{\eta} = \frac{C_{tap} \cdot (V_{bus}^2 - V_{reg}^2)}{2},$$

Where:
$P_1$=the power needed to supply the tap;
t=the ride-through time;
η=the average efficiency of the converter;
$C_{tap}$=the size of the capacitor;
$V_{bus}$=the nominal voltage of the power bus; and
$V_{reg}$=the drop out voltage of the voltage regulator.
This equation can be rewritten as:

$$C_{tap} = \frac{2 \cdot P_1 \cdot t}{\eta \cdot (V_{bus}^2 - V_{reg}^2)}$$

As used herein, "stored energy equation" refers to the foregoing equation.

As mentioned above, the distributed power bus 10 is supplied power from an off-line regulator or converter 25. The off-line regulator 25 converts the control power voltage from the control power 15 to the distributed power bus voltage. The off-line regulator 25 also provides electrical isolation between the control power 15 and the distributed power bus 10.

The system of the FIGURE could be implemented in a device used to monitor the power of an electrical circuit. Such devices are typically used to monitor power flowing through a main or feeder breaker.

This inventive system of power storage described above allows for smaller and less expensive energy storage capacitors to be supplied with the base unit. The added space and cost for "ride through" capacitance associated with options would be included with the individual option, rather than being accommodated by larger capacitor banks at the base unit.

The invention can be used with any electronic circuit where size is limited, options are needed, and ride through of power interruption is required, such as, for example, a programmable logic controller (PLC) or a computer/data server mainframe.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A power meter system that monitors electrical power characteristics of an electrical circuit connected to a power system, including:
   a power bus having a power bus voltage coupled to a power source having a power source voltage;
   a power converter coupled to said power source, said power converter converting said power source voltage to said power bus voltage and electrically isolating said power source from said power bus of said power meter system; and
   a plurality of power taps coupled to said power bus, each of said power taps having a ride-through capacitor operatively coupled thereto to provide power to a circuit coupled with said power tap during brief interruptions in said power source to each of said respective power taps, each of said power taps further having a voltage regulator for converting the bus voltage of said power bus to the circuit voltage required for said circuit coupled with said power tap.

2. The system of claim 1 further including a main metering circuitry coupled with one of said power taps.

3. The system of claim 2 and further including a communication module operatively coupled with one of said power taps.

4. The system of claim 2 and further including an input/output module operatively coupled with one of said power taps.

5. The system of claim 3 and further including an input/output module operatively coupled with one of said power taps.

6. The system of claim 2 wherein said power source comprises an offline power source.

7. A method of providing power to a power meter during brief interruptions in a power source, comprising:
   converting, in a power converter, a power source voltage of a power source to a power bus voltage of a power bus;
   electrically isolating, via said power converter, said power source from said power bus;

coupling, through said power converter, said power bus to said power source supplying power to said power meter; and connecting a plurality of detachable modules to said power bus, each of said detachable modules including a circuit that receives power from a voltage regulator coupled thereto and to a ride-through capacitor that stores energy to power said circuit during brief interruptions in said power source.

8. The method of claim 7 wherein each voltage regulator electrically isolates said circuit from said power bus.

9. The method of claim 7, further comprising coupling a main metering system to one of said detachable modules.

10. The method of claim 9, wherein one of said detachable modules includes a communication module that communicates at least meter data to a remote location.

11. The method of claim 9, wherein one of said detachable modules includes an input/output module.

12. The method of claim 9, wherein said power bus voltage is a DC voltage.

13. The method of claim 9 wherein said power source comprises an offline power source.

14. The method of claim 9 further comprising sizing each ride-through capacitor according to a stored energy equation as a function of at least the drop out voltage of said voltage regulator coupled to said ride-through capacitor.

15. An expandable power meter system for compensating for brief interruptions in supply power, comprising:

a base unit coupled to a power source, said base unit including a power converter and a power bus having an associated power bus voltage, said power converter converting the voltage of said power source of said expandable power meter system to said power bus voltage; and a plurality of modules operatively coupled to said base unit via said power bus, each of said modules including a ride-through capacitor, a voltage regulator coupled to said ride-through capacitor, and an electrical circuit that receives power from said voltage regulator, wherein said ride-through capacitor provides power to each of said respective modules during brief interruptions in the power supplied from said power source, and wherein said voltage regulator converts said power bus voltage to the voltage for said electrical circuit.

16. The system of claim 15 wherein said electrical circuit of a first one of said plurality of modules is a main metering circuit.

17. The system of claim 16 wherein said electrical circuit of a second one of said plurality of modules is a communication circuit.

18. The system of claim 16 wherein said electrical circuit of a third one of said plurality of modules is an input/output circuit.

19. The system of claim 16 wherein said power source is an offline power source.

20. The system of claim 15 wherein said power converter provides electrical isolation between said power source and said power bus.

21. The system of claim 15, wherein the size of each ride-through capacitor is given by a stored energy equation.

22. The power monitoring system of claim 1, wherein said power bus voltage is a DC voltage.

23. The expandable power meter system of claim 15, wherein said power bus voltage is a DC voltage.

* * * * *